INVENTORS
SIDNEY WEISER
STANLEY D. FISHMAN
JOSEPH R. SCHULMAN

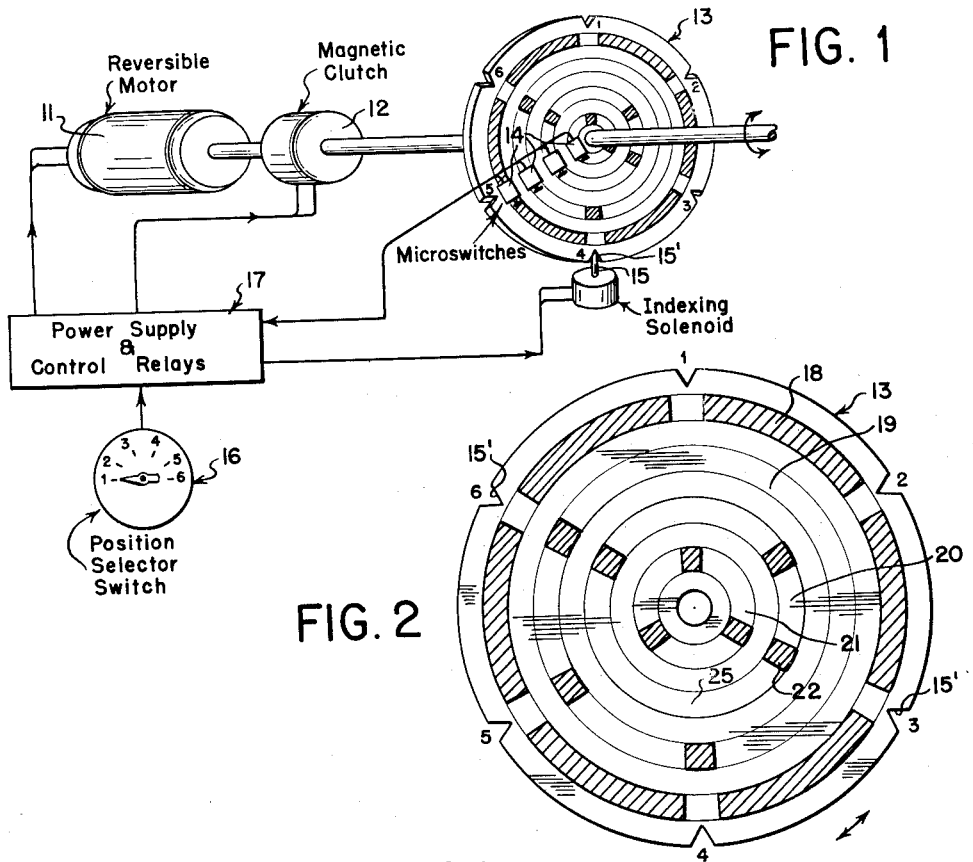

United States Patent Office 2,989,680
Patented June 20, 1961

2,989,680
DIRECTION-SENSITIVE BINARY CODE SELECTIVE POSITION CONTROL SYSTEM

Sidney Weiser, Silver Spring, Md., Stanley D. Fishman, Washington, D.C., and Joseph R. Schulman, Silver Spring, Md., assignors to U.S. Industries, Inc., New York, N.Y., a corporation of Delaware
Filed July 2, 1959, Ser. No. 824,724
5 Claims. (Cl. 318—467)

This invention relates to bi-directional automatic position control of a movable element in a closed endless path, and more particularly to a direction-sensitive binary code control system which directs the movement of the controlled element through the shorter path on successive position assignments.

A principal object of the invention is to provide an electrical remote control system employing binary-code position sensing devices which is capable of accurately positioning a rotatable shaft or the like to any one of a finite number of predetermined positions with a minimum of waste travel or motion.

In accordance with the invention, a plurality of binary code switches are provided for sensing and identifying a finite number of desired positions for a driven controlled element such as a rotatable shaft. The binary code switches are adapted to convert the actual shaft position in binary form to decimal-number form. Thereafter first and second decimal comparisons are effected with an input order-position switch to provide separate forward-drive and reverse-drive control signals. Thus the control system of the invention always advances the controlled element in a selected forward direction unless the second decimal comparison establishes that the drive system should be reversed in direction so that the element will be moved through the shorter path to the newly ordered position.

A separate intermediate-position sensing binary-switch is provided as a part of the invention. This switch functions to energize the drive motor whenever the controlled element is situated between any of the coded positions. In so functioning, intermediate "dead spots" are eliminated and system position resolution is enhanced.

An electrical-solenoid actuated indexing pawl is provided to positively lock the controlled-element at the exact desired position. This solenoid is energized and de-energized along with the driving motor or the magnetic driving clutch, as the case may be.

Further features and operating advantages of this invention will become apparent from the description of the specification considered in conjunction with the drawings in which:

FIG. 1 shows a mechanical structure embodying the invention;

FIG. 2 is a plan view of a binary coded shaft position indicator having six coded positions in accordance with the invention;

FIG. 2a is a switching code table or chart for our position control servosystem.

Figure 3:
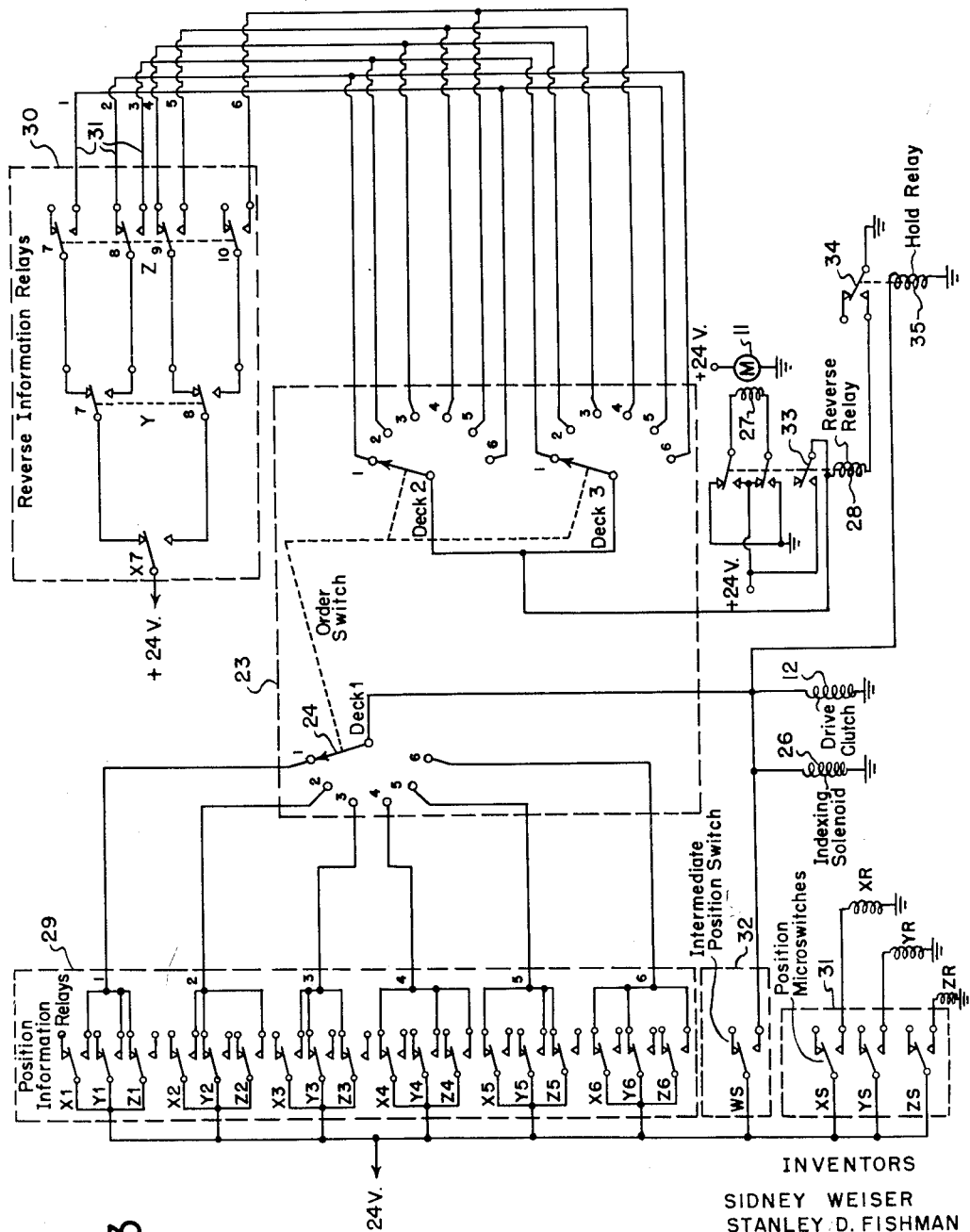
FIG. 3 is a schematic diagram which shows the electrical control circuits for a six-position control system, in accordance with the invention.

Referring to FIG. 1 there is shown a control system for rotating a controlled shaft 10 into any one of six different positions in response to three-digit binary code signals. Although the code system selected for purposes of illustration is the natural binary code, the system of this invention may be adapted to operate equally well with the so-called reflected-binary code (Gray Code). A reversible electric motor 11 provides drive power to the controlled shaft through magnetic clutch 12. Coded disc 13 is mounted on shaft 10 and microswitches 14 ride on individual tracks thereon to provide binary-code position information for the position control system. A solenoid operated indexing pawl 15 operating in conjunction with detent 15' serves to positively lock disc 13 in the desired preselected position once the drive motor has rotated the shaft thereto in response to the selected setting of position selector switch 16. The drive motor, magnetic clutch and indexing solenoid are all energized and de-energized by relays 17 which translate the binary-code position information to equivalent decimal-number information and compare the command position information to the present position information to develop the necessary control signals.

While the coded control disc shown in FIG. 2 is designed to mechanically operate binary microswitches, it will be apparent to those skilled in the art than an equivalent arrangement may be employed wherein the switching action is effected by electrical conducting strips mounted on an insulated disc operating in conjunction with individual commutating brushes. In the embodiment shown in FIG. 2, four separate circular tracks 18, 19, 20 and 21 are provided for actuating four separate-binary code microswitches. The individual tracks have raised segments 22 which close the microswitches when they pass under the switch arms and lowered segments 25 which permit the switches to open when the switches pass over these track sections. The three inner tracks 19, 20, 21 carry the (narrow-angle) segments which actuate microswitches XS, YS and ZS to develop natural binary codes representing each of the six indicated possible positions 1 through 6. These code switch combinations are shown in chart form in FIG. 2a.

The outer track 21 shown in FIG. 2 is provided to control a separate microswitch "WS" which energizes the drive motor whenever the controlled shaft is situated at an undesired position intermediate any of the six possible desired positions. It should be noted that switch "W" is always turned off when the code disc rotates through each of the six control positions, whereas the binary-code switches "XS," "YS" and "ZS" (one or more) are turned on during these intervals.

The schematic diagram in FIG. 3 shows the entire electrical control circuitry for one embodiment of this invention. Position sensing microswitches XS, YS and ZS shown at 31 operate co-operatively with the code disc shown in FIG. 2 to develop control signals for energizing the coils XR, YR and ZR of relays X, Y and Z. Relays X, Y and Z are multiple pole double throw relays the contacts of which are connected in appropriate combinations to translate the binary code assigned to each desired position to a decimal equivalent. Thus the first set of contacts for these relays, X1, Y1, Z1 shown at 29 are connected in parallel between the 24-volt power supply and position 1 on deck 1 of the position order switch 23. The rotor arm 24 of this switch deck is connected to the drive clutch coil 12, indexing solenoid 26 and to the hold relay 35. It will be noted that contacts Z1 are normally closed so that energizing power is supplied to the clutch, solenoid and hold relay when the order switch is moved to position 1 and the code disc is located at any one of the other five possible positions. Drive motor 11 will normally advance the control shaft and code disc in a selected forward direction until position 1 is reached whereupon the raised track segment at that position will actuate microswitch ZS, open the relay contacts Z1, de-energize the drive motor clutch, indexing solenoid and hold relay and mechanically index the disc at the ordered position 1. Generally speaking, relays X, Y and Z function as position information relays translating the binary code microswitch signals to decimal equivalents for each of the six positions. These decimal signals are compared with the corresponding decimal positions (six) appearing on deck 1 of the position order switch. Whenever a disparity exists between the ordered position and an existing position, the control system is activated until the disparity is removed.

Bi-directional sense is provided in accordance with the teachings of this invention by the selected contacts of relays X, Y and Z shown at 30. These contacts translate present shaft position information in binary code form to a decimal-number equivalent and thence develop the control signals for actuating the motor reverse relay 28. It will be noted that the selected contacts of relays X, Y and Z are connected in series relation between the 24-volt power source and the respective second and third switch decks of order switch 23. Furthermore, it will be noted that the corresponding switch contacts for the respective control positions at 29 are wired to be oppositely closed instead of open and vice versa. Thus comparing position 1 in each instance X7 and Y7 are normally closed whereas X1 and Y1 are normally open; Z7 is normally open while Z1 is normally closed. The reverse information relays are thus connected to provide output control power to the respective output leads 31 (1 through 6) accordingly as each position is occupied. Operation of this part of the invention can best be explained by example. For instance, if the controlled shaft were positioned at position 1, relay contact Z7 would be closed by microswitch ZS (see code in FIG. 2a) and power would be supplied to terminal 6 deck 2 and terminal 5 deck 3 of order switch 23. If either of these positions were ordered by so setting the order switch, power would be supplied to the reverse relay 28 which would cause a reversal of current flow through motor field 27 and hence, a reversal in the direction of rotation of the drive motor 11. When any other positions are ordered, the shaft is rotated in the normal forward clockwise direction. Only position 5 and 6 (moving from position 1) require the drive motor to be reversed in order that the controlled shaft move through the shorter path to the new assignment.

Contacts 33 are provided on the reverse relay to maintain a holding voltage on the coil of this relay during the intervals of rotation of the code disc through the intermediate non-coded positions. The ground return for the reverse relay coil is completed through contacts 34 of the hold relay 35. This relay is always energized whenever the code disc is located at either an intermediate non-coded position or an undesired coded position. When the code disc is moved to the desired coded position, the holding relay is de-energized and the reverse relay is in turn released.

It will be noted that there are two possible requirements for drive reversal for each of the six possible positions shown in the specific embodiment. The two separate switch decks (2 and 3) on the order switch provide the necessary decimal comparisons between the binary translation relay outputs 31 and the order switch to develop the necessary reverse control signals. For the sake of simplicity the embodiment shown in the drawings is limited to six possible control positions. It will be apparent to those skilled in the art that the control system disclosed in this invention can be extended to accommodate any reasonable number of positions. In general it can be said that one additional switch deck is required on the order switch 23 for each additional position requiring motor reversal to achieve the shorter path traversal. Thus when an eight position control is desired, three separate decks are required on the order switch to develop the necessary motor reverse control, whereas in a sixteen position control system, seven separate switch decks are required.

The decimal comparison system provided by this invention always directs the drive motor to reverse its normal direction of travel when the newly ordered position is disposed less than 180° in the reverse direction from the existing position. Should the controlled shaft and its associated code disc inadvertently be moved to an intermediate position between two coded positions, microswitch WS, shown at 32, will be actuated by the intermediate track segments on the outer track 18 (FIG. 2) and the shaft will be advanced in the forward direction to the nearest coded position. From this position the drive system will either continue to advance the shaft in the forward direction to the newly ordered position, or reverse the direction of the drive should that path be the shorter.

Although for the purpose of explaining the invention a particular embodiment thereof has been shown and described, obvious modifications will occur to persons skilled in the art. For example, although a magnetic clutch is shown coupling the motor to the position controlled shaft, this feature may be eliminated by altering the width of the track code segments to accommodate the additional system inertia or by providing system braking or the like. These changes in the construction and arrangement of this invention, along with others, may be made without departing from the scope thereof as defined by the appended claims.

We claim:

1. In a digital position control system the combination comprising, a controlled member movable bi-directionally from any position in a closed path through a plurality of discrete positions, reversible drive motor means adapted to move said controlled member in either direction in said closed path, means responsive to movement of said controlled member to produce separate multi-digit binary code control signals corresponding to each respective discrete position, first translation means provided to convert each of said binary code control signals to a corresponding decimal-number control signal, a first order-position switch adapted to selectively connect any one of said decimal-number control signals to said drive motor means whereby said means is energized to move said controlled member in a forward direction to the corresponding discrete position, second translation means provided to convert each of said binary code control signals to second equivalent decimal-number control signals, a second order-position switch adapted to operate conjointly with said first switch and co-operatively with said second translation means to provide reverse control signals, and circuit means actuated by said reverse control signals to reverse the direction of rotation of said drive motor means whereby said controlled member is moved from one position to the next through the shorter of the two paths.

2. In a digital position control system the combination comprising, a controlled member movable bi-directionally from any position in a closed path through a plurality of discrete positions, reversible electric motor driving means, magnetic clutch means, said motor driving means being coupled mechanically to said controlled member by said magnetic clutch, means responsive to movement of said controlled member to produce separate multi-digit binary code control signals corresponding to each respective discrete position, first translation means provided to convert each of said binary code control signals to a corresponding decimal-number control signal, a first order-position switch adapted to selectively connect any one of said decimal-number control signals to said magnetic clutch means whereby said clutch means is energized to move said controlled member in a forward direction to the corresponding discrete position, second translation means provided to convert each of said binary code control signals to second equivalent decimal-number control signals, a second order-position switch adapted to operate conjointly with said first switch and co-operatively with said second translation means to provide reverse control signals, and circuit means actuated by said reverse control signals to reverse the direction of rotation of said drive motor means whereby said controlled member is moved from one position to the next through the shorter of the two paths.

3. In a digital position control system the combination comprising, a controlled member movable bi-directionally from any position in a closed path through a plurality of discrete positions, reversible electric motor driving means, magnetic clutch means, said motor driving means being coupled mechanically to said controlled member by said magnetic clutch, means responsive to movement of said controlled member throughout positions intermediate said discrete positions to directly energize said magnetic clutch, means responsive to movement of said controlled member to produce separate multi-digit binary code control signals corresponding to each respective discrete position, first translation means provided to convert each of said binary code control signals to a corresponding decimal-number control signal, a first order-position switch adapted to selectively connect any one of said decimal-number control signals to said magnetic clutch means whereby said means is energized to move said controlled member in a forward direction to the corresponding discrete position, second translation means provided to convert each of said binary code control signals to second equivalent decimal-number control signals, a second order-position switch adapted to operate conjointly with said first switch and co-operatively with said second translation means to provide reverse control signals, and circuit means actuated by said reverse control signals to reverse the direction of rotation of said drive motor means whereby said controlled member is moved from one position to the next through the shorter of the two paths.

4. In a digital position control system, the combination comprising a controlled member movable bi-directionally from any position in a closed path through a predetermined number of discrete positions, reversible drive motor means adapted to move said controlled member in either direction in said closed path, means responsive to movement of said controlled member to produce separate multi-digit binary code control signals corresponding to each respective discrete position, first translation means provided to convert each of said binary code control signals to a corresponding decimal-number position information control signal, a first order-position switch adapted to selectively connect any one of said decimal-number position information control signals to said drive motor means whereby said motor means is energized to move said controlled member in a forward direction to the corresponding discrete position, second translation means provided to convert each of said binary code control signals to second equivalent decimal-number control signals, a second order-position switch adapted to operate conjointly with said first switch and co-operatively with said second translation means to provide reverse information control signals, and circuit means actuated by said reverse information control signals for reversing the direction of rotation of said drive motor means when an ordered position is less than 180° in the reverse direction from the existing rest position of said controlled member.

5. In a digital position control system, the combination comprising a controlled member movable bi-directionally from any position in a closed path through a predetermined number of discrete positions, reversible drive motor means adapted to move said controlled member in either direction in said closed path, means responsive to movement of said controlled member to produce separate multi-digit binary code control signals corresponding to each respective discrete position, first translation means provided to convert each of said binary code control signals to a corresponding decimal-number position information control signal, first switch means having a number of order position contacts corresponding to the number of discrete positions of said member, said switch means being arranged to selectively connect any one of said decimal-number position information control signals to said drive motor means whereby said motor means is energized to move said controlled member in a predetermined forward direction to the desired order-position, second translation means provided to convert each of said binary code control signals to second equivalent decimal-number control signals, second switch means having a number of order positions corresponding to the number of discrete positions of said member, said second switch means being adapted to operate conjointly with said first switch means and co-operatively with said second translation means to provide reverse information control signals, and circuit means actuated by said reverse information control signals for reversing the direction of rotation of said drive motor means when an ordered position is less than 180° in the reverse direction from the existing rest position of said controlled member.

References Cited in the file of this patent

UNITED STATES PATENTS

| | | |
|---|---|---|
| 2,823,344 | Ragland | Feb. 11, 1958 |
| 2,823,345 | Ragland | Feb. 11, 1958 |